April 2, 1946.　　　D. S. KELLOGG　　　2,397,477
RADIO CONTROL SYSTEM FOR MOVING VEHICLES
Filed March 23, 1940　　　4 Sheets-Sheet 1

INVENTOR.
DONALD S. KELLOGG
BY Moss & Nolte
ATTORNEYS.

April 2, 1946.　　　D. S. KELLOGG　　　2,397,477
RADIO CONTROL SYSTEM FOR MOVING VEHICLES
Filed March 23, 1940　　4 Sheets-Sheet 4

INVENTOR.
DONALD S. KELLOGG
BY
ATTORNEYS.

Patented Apr. 2, 1946

2,397,477

UNITED STATES PATENT OFFICE

2,397,477

RADIO CONTROL SYSTEM FOR MOVING VEHICLES

Donald S. Kellogg, Jackson Heights, N. Y., assignor, by mesne assignments, to The W. L. Maxson Corporation, New York, N. Y., a corporation of New York Application March 23, 1940, Serial No. 325,497

11 Claims. (Cl. 172—239)

This invention relates to the control of one or more parts of a device from a remote point by means of electrical impulses, and more especially to the control of certain parts of an airplane, ship or other movable vehicle or to a part or parts of an object carried by the vehicle. As illustrations of the use to which the invention is adapted, it may be employed to control the elevators, ailerons, rudder and other movable parts of an airplane which control its flight. The invention is also adapted to control instruments or objects carried by the plane such as radio receivers or transmitters, cameras, etc., or to control devices adapted to release objects such as bombs, etc., from airplanes.

In pursuance of the invention, the control is effected by radio signals and preferably by transmission to the vehicle of a carrier wave of radio frequency, a suitable radio receiver being provided on the vehicle to receive the control signals and transmit them to suitable apparatus which accomplishes the desired control of the intended part or parts.

It is an object of the invention to effect the control of the desired part or parts in any direction and through any desired extent or angle of adjustment by the transmission of pulses of energy of controlled duration and to provide, at the controlled device, suitable mechanism which effects the control in accordance with the duration of the pulses.

To provide energy pulses of a duration closely corresponding to the extent of adjustment of the control member, it is a further object of the invention to provide at the transmitting station a novel means and method for controlling the action of one or more oscillators which effect the modulation of the transmitted carrier wave. In pursuance of this object, the control of the oscillators is preferably effected by a novel circuit arrangement which includes a relay and a relay control device comprising a Wheatstone bridge arrangement.

In accordance with a further object of the invention, the control of the movable controlled part on the airplane or other vehicle is effected by a control handle located at a ground station or in another vehicle, the controlled member moving in one direction or in an opposite direction in accordance with the movement of the control handle in one direction or in an opposite direction from a neutral position thereof. The control handle or stick is preferably mounted for universal movement similar to the control stick of an airplane, so that it may be mounted to rotate either of two shafts disposed at right-angles to each other or to rotate both shafts together to effect the control of two different controlled members simultaneously.

A still further object of the invention is to provide a control arrangement which includes a Wheatstone bridge so arranged as to cause the controlled member to be operated substantially in synchronism with the control stick. This object is effected by means which includes one or more compensating resistors which are so associated with the bridge circuit as to secure uniform sensitivity throughout the control range.

Another object of the invention is to provide in association with a galvanometer relay disposed across the neutral points of a Wheatstone bridge, a resistor arrangement for controlling the sensitivity level. This resistor arrangement is preferably so arranged that the impedance of the galvanometer leg of the circuit remains substantially constant for different sensitivity levels as established by different resistor settings.

Other and further objects of the invention will become apparent to those skilled in the art as the description thereof proceeds. For a better understanding of the invention, however, reference is made to the accompanying drawings in which.

Figure 1:
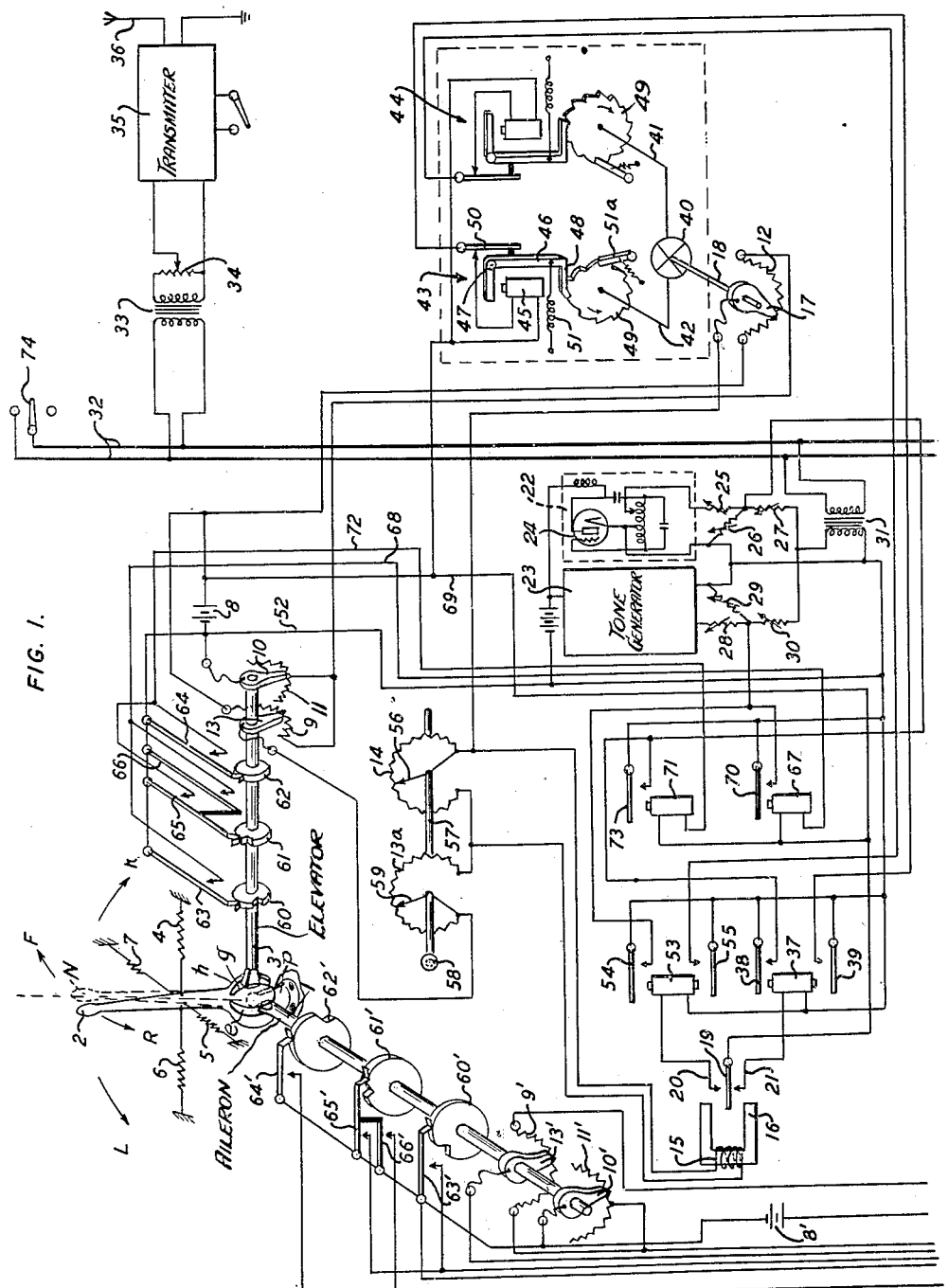
Fig. 1 is a schematic circuit diagram of a radio transmission system embodying the invention and also showing certain mechanical control features schematically.

Referring to Fig. 1, a rotatable control shaft 1 is shown as provided with a control lever or stick 2 mounted for universal movement, in the manner of the usual control stick of an airplane, so that its rotation in a plane normal to the longitudinal axis of shaft 1 causes rotation of this shaft while its rotation in a plane passing through the axis of shaft 1 causes rotation of a second shaft 3 mounted to rotate about a lateral axis at right-angles to shaft 1. Rotation of lever 2 in intermediate planes obviously causes rotation of both the shafts 1 and 3 simultaneously. In the illustrated embodiment of the invention, the lower end of the lever 2 is provided with an enlarged head $h$ having a ball and socket connection with a supporting pedestal P. The ends of the shafts 1 and 3 are flattened and are received in a pair of vertical grooves $e$ and $g$ formed in the head $h$. A set of four springs 4, 5, 6 and 7, each having one end connected to stick 2 and its other end stationary, serves to return the stick to the normal neutral position N as indicated in Fig. 1, after its use and release by the operator. Movement of stick 2 from its neutral position serves to unbalance a Wheatstone bridge circuit which comprises a battery 8 whose positive terminal is directly connected to one end of a resistor 9 and whose negative terminal is connected to the opposite end of resistor 9 through the rheostat arm 10 secured to shaft 3 and movable along a compensating resistor 11, the midpoint of resistor 11 being connected to the end of resistor 9 through the lead shown. The resistor 9 forms two arms of the Wheatstone bridge, the other two opposite arms being formed by a resistor 12 whose ends are connected, as shown, to the opposite ends of resistor 9. The cross arm of the bridge circuit, or the circuit which connects the conjugate neutral points of the bridge when it is balanced, comprises a rheostat arm 13 secured to the shaft 3 and adjustable along resistor 9, a series resistor 13a, a variable resistor 14 which is connected in shunt across the coil windings 15 of a polarized or galvanometer relay 16, and a rheostat arm 17 which is adjustable along the resistor 12 and secured to a shaft 18.

With the stick 2 in its neutral position, as indicated at N, the rheostat arm 13 is at the center of resistor 9 and rheostat arm 17 at the center of resistor 12 and the bridge is balanced, with no current passing through the relay winding 15 so that the relay armature 19 is centrally disposed between its upper and lower contacts 20 and 21. Movement of stick 2 rearwardly in the direction R into the full line position shown, causes rheostat arm 13 to be moved from the center of resistor 9 into the full line position shown, thereby changing its potential with reference to the rheostat arm 17 and unbalancing the bridge circuit, the amount or degree of this unbalance depending on the extent of rotation of stick 2 and shaft 3.

The effect of unbalancing the bridge circuit is to eliminate the tone frequency of one of two audio frequency generators 22, 23 from the transmission as long as the bridge circuit remains unbalanced. Each of these generators comprises a vacuum tube oscillator, such as 24, whose output terminals are connected through the resistance networks 25, 26, 27, 28, 29, 30 and transformer 31 to the tone bus bars 32, the resistors 25, 26, etc., preferably being adjustable, as indicated. The generators 22, 23 are preferably designed to generate tone frequencies of 1020 and 1380 cycles per second, respectively, although it will be understood that any other suitable frequencies may be used. The tone bus bars 32 are connected by any suitable means, such as the transformer 33 and variable resistor 34 to the modulator input terminals of a radio frequency transmitter 35 arranged to generate a carrier current of constant frequency. The output terminals of transmitter 35 are connected to an antenna 36. When the transmitting equipment is located at a ground station, one of the transmitter terminals may be connected to ground, as shown, and when the transmitting equipment is mounted on a movable vehicle, as for example, in another airplane, any suitable known type of transmitting antenna may be provided. It will be understood that the output of transmitter 35 is normally modulated by the tone frequencies of both the generators 22 and 23, and that the tone frequency of generator 22, for example, is caused to be eliminated from transmission by movement of the stick 2 rearwardly in the direction R from its neutral position and the tone frequency of generator 23 eliminated from the transmission by movement of the stick forwardly in the direction F.

Assuming that movement of the stick 2 rearwardly and the consequent unbalancing of the bridge circuit causes the relay armature 19 to engage the lower contact 21, the closure of this contact causes the operation of a relay 37 whose coil is connected across the positive and negative terminals of battery 8 through the armature 19, lower relay contact 21 and the circuit shown. Operation of relay 37 causes its upper and lower contacts 38 and 39 to close, the closure of contact 38 causing a short-circuiting of resistor 26 through the circuit connections shown with the consequent elimination of the tone frequency of generator 22 from the transmission. The elimination of this tone frequency continues during the interval of time elapsing until the bridge circuit is again balanced.

The preferred means for automatically balancing the bridge circuit comprises a differential gearing device 40 having the output shaft 18 and a pair of input shafts 41 and 42 adapted to be rotated in opposite directions by the impulse motors 43 and 44. Each of these motors comprises a magnet 45 having an armature 46 pivoted at 47 and carrying a pawl 48 adapted to rotate a ratchet wheel 49, the ratchet wheels 49 being mounted on the differential input shafts 41 and 42.

Passage of current through relay magnet 45 of motor 43 causes its armature 46 to be rotated in a counter-clockwise direction, causing the pawl 48 to be moved to the right a distance sufficient to engage it behind the next ratchet tooth. The motor circuit is simultaneously broken by a movable contact 50 which is opened by the movement of the armature 46, whereupon a spring 51 connected to armature 46 causes the pawl 48 to advance the ratchet wheel 49 a distance of one tooth in a counter-clockwise direction. A suitable holding pawl 51a is provided to engage the ratchet wheel 49 to prevent retrograde movement thereof. This operation is repeated causing the rotation of differential 40 and shaft 18 until the rheostat arm 17 has been rotated along resistor 12 through a sufficient angle as to again balance the bridge circuit. The closure of the lower relay contact 39 completes a circuit including the lead 52, battery 8, coil of magnet 45, movable contact 50 and the leads shown, thereby causing the operation of motor 43 in the manner above described. Upon the rheostat arm 17 being adjusted by the motor 43 into such a position on the resistor 12 as to balance the bridge circuit, current will cease to flow through the winding 15 of the polarized relay 16 so that its armature 19 returns to its normal central position, as shown, thereby breaking the circuit through the relay 37 and causing the opening of its upper and lower relay contacts 38 and 39. Opening of the contact 39 breaks the circuit of the energizing winding 45 of motor 43 and stops the motor. The opening of contact 38 discontinues the short-circuit of resistor 26, and thereby restores the tone frequency of generator 22 to the transmission.

Upon movement of the stick 2 forwardly in the direction F, movement of the rheostat arm 13 along resistor 9 unbalances the bridge circuit in such a direction as to cause the relay armature 19 to close the upper relay contact 20 which in turn causes the relay 53 to be energized by current from battery 8 through the circuit connections shown including the upper contact 20 and armature 19. Operation of relay 53 causes its contacts 54 and 55 to close, the closure of contact 54 causing a short-circuiting of resistor 29 through the circuit shown with the consequent elimination of the tone frequency of generator 23 from transmission. The elimination of this tone frequency continues until the bridge circuit is again brought to a balance. This balancing is initiated by the closure of the lower relay contact 55 which completes the circuit shown, including the contact 55, lead 52, battery 8, magnet coil 45 of impulse motor 44, and movable contact 50, thereby causing the operation of motor 44 and the rotation of rheostat arm 17 along resistor 12 in a clockwise direction a distance sufficient to rebalance the bridge circuit. Current then ceases to flow through the winding 15 of the polarized relay 16, its armature 19 returns to its central position, as shown, thereby breaking the circuit through the relay 53 and causing the opening of its upper and lower contacts 54, 55. Opening of the contact 55 breaks the circuit of the winding 45 of motor 44 and stops this motor. The opening of contact 54 discontinues the short-circuit of resistor 29 and thereby immediately restores the tone frequency of generator 23 to the transmission.

To obtain a uniform sensitivity or uniformity of control of the impulse motors 43 and 44 for equal adjustments of the control stick 2 and rheostat arm 13 throughout their range of control, the rheostat arm 10 and compensating resistor 11 are provided. With the control stick 2 in its neutral position, the rheostat arm 10 is disposed in its central position and the value of resistor 11 which is in series with the Wheatstone bridge circuit comprising the bridge arms 9 and 12 is substantially zero. As the control stick 2 is displaced from its neutral position in either direction, however, to unbalance the bridge circuit for the purpose above described, the movement of rheostat arm 10 along the resistor 11 serves to add resistance in series with the bridge circuit, the amount of this added resistance being such as to secure the desired uniformity of action of the polarized relay 16 and the impulse motors 43, 44 for equal displacements of the control stick throughout any portion of its range of movement. The compensating resistor 11 is preferably designed so that the rate in the increase of its resistance, which is included in series with the bridge circuit, preferably increases as the control stick 2 is moved from its neutral position toward either of its extreme positions. This result may be secured by tapering the resistor 11 so that its resistance per unit length increases steadily from its center toward its ends, or may be approximated by making it in sections, the resistance of each section being uniform along its length, but the resistance of successive sections increasing from the center toward its ends. In the absence of a suitable compensating means, such as the resistor 11, it has been found that the bridge circuit has a minimum sensitivity at the neutral position of the stick 2, and a maximum sensitivity of control at either extreme position thereof. This invention provides a means for securing a uniform sensitivity throughout the range of movement of the control stick. While the rheostat arm 10 is shown as mounted on the shaft 3, it could be mounted on the motor shaft 18 instead.

To control the sensitivity level of the polarized relay 16 or, in other words, to control the proportion of the bridge current which passes through its winding 15 when the bridge is unbalanced, a variable resistor 14 is shown connected across the ends of winding 15. This resistor is varied by means of a rheostat arm 56 connected to a control shaft 57 having an operating knob 58. In order to provide for the change in resistance of the cross arm of the bridge circuit including the relay winding 15 which would otherwise occur upon the adjustment of the shunting resistor 14, a second adjustable resistor 13a is provided and connected in series between one end of resistor 14 and the rheostat arm 13, the portion of resistor 13a which is included in circuit being controlled by a second rheostat arm 59 carried by the shaft 57, as shown. The arrangement is preferably such that as the resistance value of 14 is increased, that of 13a is simultaneously decreased and vice versa, the resistors being designed so that the total impedance of the circuit forming the cross arm of the bridge remains substantially constant for all adjustments of the shaft 57.

If the movement of stick 2 to rotate the shaft 3 in one direction is arranged to tilt the elevators upward from their mid-position to raise the airplane, then its movement in the opposite direction will tilt them downward to depress the airplane. Movement of the stick 2 to rotate the shaft 1 in one direction may be arranged to lower the right aileron from its normal wing position and raise the left aileron to thereby bank the airplane on its left side. Movement of the stick 2 in the opposite direction will then cause the right aileron to be raised and the left aileron lowered to cause the banking of the airplane on its right side. It will be understood that a bridge circuit as heretofore described is provided at the control station for each airplane or other part to be controlled and that a pair of sources of signalling tone similar to 22 and 23 are associated with each bridge circuit and connected to the tone bus bars 32 through a transformer and resistance network similar to that above described.

The arrangement described causes the extent of movement of stick 2 to determine the time interval required for the bridge circuit to be rebalanced and this corresponds to the duration of the omission of transmission of one tone and, therefore, also to the time during which one tone is transmitted to effect the remote control. Since, as will be explained later, the response of the controlled part of the airplane depends on the length of time of omission of a tone frequency, it follows that for optimum results, the closest possible agreement in phase relationship between the control lever at the ground station and that on the airplane should be secured. However, during the normal running of an airplane, the control lever 2 is frequently passed through its neutral or mid-position, at which point synchronization of the control lever on the airplane and that at the ground station is reestablished in case there is not a close agreement in phase relationship between them.

For the purpose of establishing this synchronization, means is provided to eliminate the tone frequencies of both the generators 22 and 23 from transmission while the stick 2 remains in its neutral position, to continue the elimination from transmission of the tone of generator 23 while the stick is held in its extreme forward position (F) and the elimination of the tone of generator 22 while the stick is held in its extreme rearward position (R). This means comprises a number of cams 60, 61 and 62 secured to the shaft 3, the cam 60 serving to open and close a switch 63, cam 62 to open and close a switch 64 and cam 61 to open and close a pair of switches 65 and 66. When the stick 2 is brought into its neutral position, as indicated at N in Fig. 1, the switches 65 and 66 are both closed. Closure of switch 65 serves to energize a relay 67 by current from battery 8 through the circuit shown which includes battery 8, switch 65, lead 68, coil of relay 67, and lead 69 which connects to the positive terminal of battery 8. Energization of relay 67 causes its switch contact 70 to close, thereby establishing a short circuit across resistor 29 and eliminating the tone of generator 23 from transmission. The closure of switch 66 serves to energize the relay 71 by current from battery 8 through the circuit shown including battery 8, switch 66, lead 72, coil of relay 71, and return lead 69. Energization of the relay 71 causes its switch contact 73 to close, thereby establishing a short circuit across resistor 26 and eliminating the tone of generator 22 from the transmission. The omission of the tone frequencies of both generators 22 and 23 from the transmission in the manner described causes the controlled shaft of the airplane to be automatically moved into its neutral position by means to be later described.

While the control lever 2 is being moved forward in the direction F, the upper polarized relay contact 20 closes and causes the tone frequency of generator 23 to be eliminated from the transmission in the manner above described. This causes the controlled member on the airplane to be moved in the same direction by means to be later described. Upon stopping the lever 2 in its extreme forward position, the cam 60 causes the closure of switch contact 63 which establishes the circuit shown including battery 8, switch 63, lead 69 and the winding of relay 67. Operation of this relay causes its contact 70 to close, thereby establishing a short-circuit across resistor 29 and the consequent elimination of the tone frequency of generator 23 as long as lever 2 is held in its extreme forward position. This omission of the tone of generator 23 causes the controlled member of the airplane to continue its motion in the same direction until it reaches its extreme forward position when it is again in phase with control lever 2.

In a similar manner, movement of lever 2 rearwardly in the direction R causes the elimination of the tone of generator 22 from the transmission in the manner hereinbefore described. This causes the controlled member on the airplane to be moved in the same direction by means to be later described. Upon stopping the lever 2 in its extreme rearward position, the cam 62 causes the closure of switch contact 64 which establishes a circuit including battery 8, contact 64, lead 72 and the winding of relay 71. Operation of this relay causes its contact 73 to close, thereby establishing a short-circuit across resistor 26 and the consequent elimination of the tone frequency of generator 22 from the transmission while the lever 2 is maintained in its extreme rearward position. This omission of the tone of generator 22 causes the controlled member of the airplane to continue its motion in the same direction until it reaches its extreme rearward position and is again in phase with control lever 2.

For the purpose of readily eliminating all the tones from the transmission, a bus bar switch 74 is provided, the closure of which serves to short-circuit the tone bus bars 32 and eliminate the tones of all the generators connected thereto from the transmission. This causes all the controlled members on the airplane to be automatically returned to their mid or neutral positions in a manner to be later described.

Figure 2:
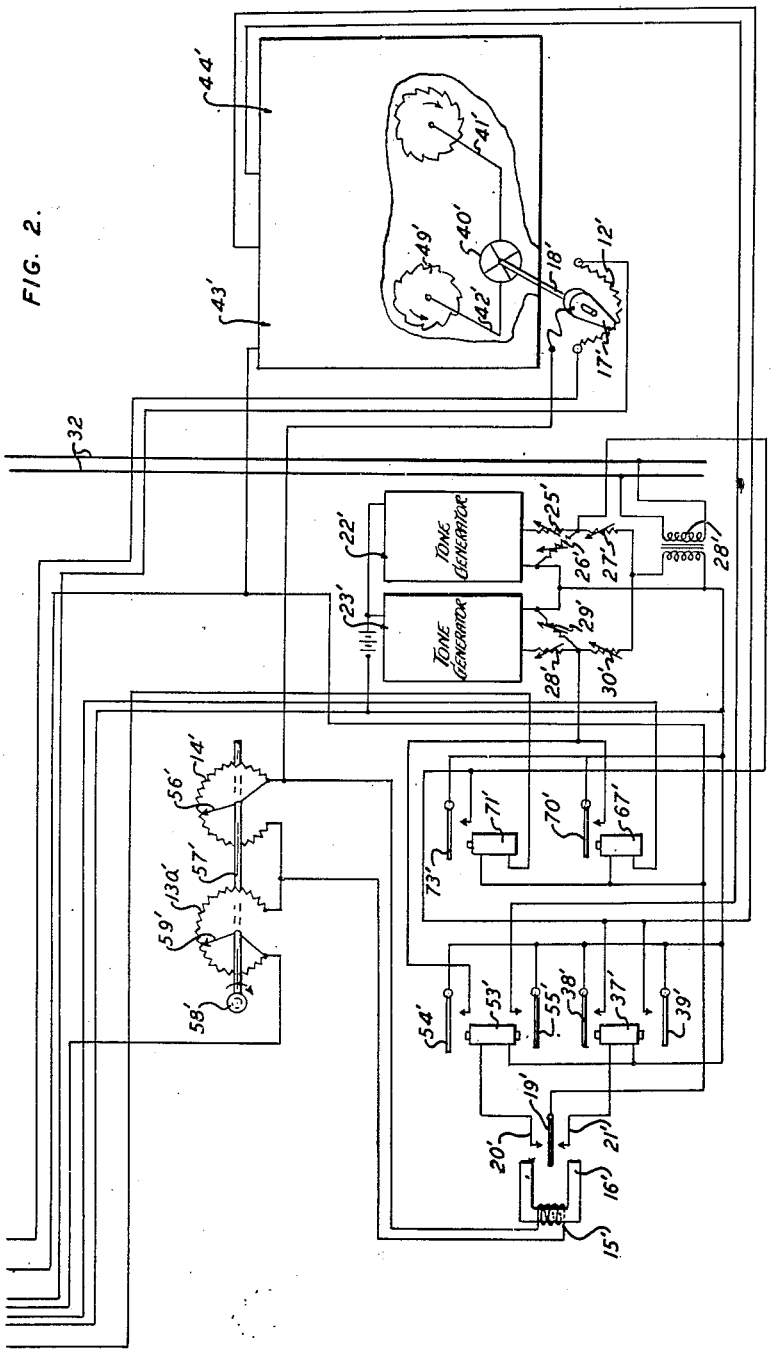
Fig. 2 is an extension of the transmission system of Fig. 1 showing another unit thereof.

The arrangement shown in Fig. 2 is a duplicate of certain portions of that shown in Fig. 1, corresponding parts being indicated by similar reference numerals primed. Also the cam and switch arrangement shown associated with shaft 1 is similar to that shown and described in connection with shaft 3 so that further detailed description thereof is unnecessary, similar parts being indicated by similar reference numerals primed. In this case, however, the generators 22' and 23' are arranged to generate frequencies of 1860 cycles and 2460 cycles, respectively, although it will be understood that other suitable frequencies may be used instead.

Movement of lever 2 about the longitudinal axis causes shaft 1 to rotate and rheostat arm 13' to unbalance the bridge circuit comprising resistors 9' and 12'. Movement of lever 2 to the left, as indicated at L, causes the operation of relay 16' and closure of its lower contact 21'. This causes the energization of relay 37' by current from the battery 8' through the circuit shown. Operation of relay 37' causes its upper and lower contacts 38' and 39' to close, the closure of contact 38' causing a short-circuiting of resistor 26' through the circuit connections shown and the elimination of the tone of generator 22' from the transmission, thus causing the aileron control shaft to be moved to the left. Upon moving lever 2 into its extreme leftward position, the cam 62' causes the closure of its switch contact 64' which in turn causes the energization of relay 71' by current from battery 8' through the circuit shown. The closure of contact 73' of this relay causes the short-circuiting of resistor 26' and the continued elimination of the tone of generator 22' from the transmission as long as the lever 2 is maintained in its extreme leftward position. Should for any reason the aileron control shaft not be in phase with the lever 2 when the latter reaches its extreme leftward position, it will be automatically adjusted into such an in-phase relation by means to be later described. Upon stopping the lever 2 in an intermediate position, the rheostat arm 17' is automatically rotated by the motor 43' into such a position on resistor 12' as to balance the bridge circuit and again restore the tone of generator 22' to the transmission in the same manner as above described in connection with the generator 22 and motor 43.

Movement of the lever 2 to rotate the shaft 1 to the right, as indicated at r, causes the bridge circuit to become unbalanced in such a direction as to cause the operation of relay 16' and closure of its upper contact 20'. This causes the energization of relay 53' by current from battery 8' through the circuit shown. The operation of relay 53' causes its contacts 54' and 55' to close, the closure of contact 54' causing a short-circuiting of resistor 29' and the elimination of the tone of generator 23' from the transmission.

This causes the aileron control shaft to be moved to the right during the period that the bridge remains unbalanced. The closing of the lower relay contact 55' causes the operation of motor 44' and the re-balancing of the bridge circuit in the same manner as above described in connection with the motor 44. Upon moving lever 2 into its extreme position to the right, as indicated at r, the cam 60' causes the closure of its switch contact 63' which in turn causes the energization of relay 67' by current from the battery 8' through the circuit shown. The closure of contact 70' of this relay causes the short-circuiting of resistor 29' and the continued elimination of the tone of generator 23' from the transmission as long as the lever 2 is maintained in its extreme position to the right. Means to be later described is provided on the controlled airplane to automatically adjust the aileron control shaft into its extreme position to the right in phase with the lever 2 should it, for any reason, not be in phase therewith. The cam 61' and its cooperating contacts 65', 66' serves to cause the elimination of the tones of both the generators 22' and 23' from the transmission when the lever 2 is adjusted into its neutral position in the same manner as above described in connection with the corresponding cam 61 and generators 22 and 23 of Fig. 1. The elimination of these tone frequencies from the transmission causes the controlled member on the airplane to be automatically restored to its neutral position in phase with the lever 2, should it not be in such neutral position, by means to be later described.

Figure 3:
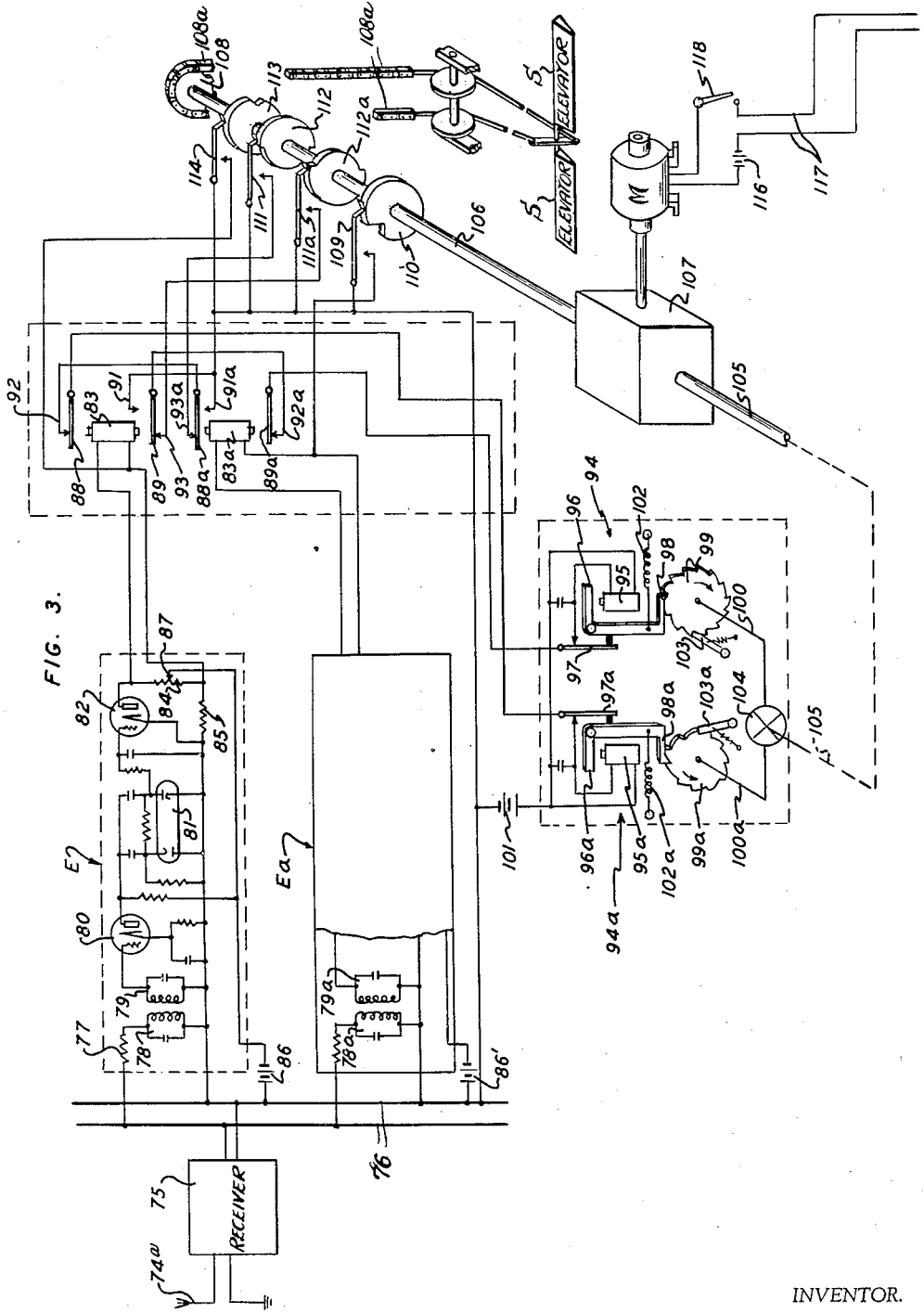
Fig. 3 is a schematic circuit diagram of a radio receiving system embodying the invention and also showing a unit of the controlled apparatus schematically.

Referring now to Fig. 3, which shows schematically the apparatus mounted on the controlled airplane for controlling its elevators, a receiving antenna 74a is connected to the input terminals of a tunable radio receiver 75 which is provided with known means for receiving the carrier wave of transmitter 35 and detecting and amplifying its modulating frequencies. The output of receiver 75 is applied to the tone bus bars 76 to which a plurality of tunable amplifying channels E, Ea, E', E'a responsive to the tone frequencies of generators 22, 23, 22' and 23', respectively, are connected. Each of these channels is similar in construction and comprises a frequency selective network comprising an isolating resistor 77 and two parallel resonant circuits 78, 79, both tuned to the audio frequency to which the particular channel is responsive. The selected current is amplified by the amplifier tube 80 and rectified by the rectifier tube 81, the rectified output of tube 81 being amplified by the direct current amplifier tube 82. The plate circuit of amplifier tube 82 is arranged to actuate a relay 83 and comprises the resistors 84, 85 and a plate battery 86. One terminal of battery 86 is connected to an adjustable contact 87 which is preferably so adjusted that no direct current flows through the winding of relay 83 when the tone frequency to which channel E is responsive is not being received. The channel Ea is similar in all respects to channel E, except that its input circuits 78a, 79a are resonant to the frequency of generator 23, its output circuit being connected to relay 83a. Relay 83 is provided with a pair of armatures 88, 89 adapted to selectively engage the inner contact 91 and the outer contacts 92, 93. The corresponding contacts of relay 83a are designated 91a, 92a, 93a and its armatures 88a, 89a.

For each of the relays 83, 83a a self-vibrating motor 94, 94a is provided, these motors being similar and each comprising a coil 95 and a movable armature 96 provided with a movable contact 97 and a pawl 98 which cooperates with the teeth of a ratchet wheel 99 mounted on a shaft 100. The movable contact 97 of motor armature 96 is connected, as shown, to armature 89a and current is supplied to coil 95 by a battery 101. A spring 102 having one end connected to a stationary point and its other end to armature 96 serves to move pawl 98 to the right after the motor circuit is broken by movable contact 97.

When the relays 83, 83a are both energized due to the transmission of the tone frequencies of both the channels E and Ea, the energizing circuits of motors 94 and 94a are open at contacts 92, 92a so that both motors are at rest. When, however, one of the relays, as, for example, relay 83 becomes de-energized, due to the cessation of transmission of the tone of channel E, its upper contact 92 is closed, thereby completing the circuit of motor 94a and causing its armature 96a to rotate counter-clockwise and move pawl 98a a sufficient distance to engage pawl 98a behind the next ratchet tooth. The motor circuit is simultaneously broken by movable contact 97a, whereupon spring 102a causes pawl 98a to advance the ratchet 99a one tooth in a counter-clockwise direction. This motion of armature 96a causes contact 97a to again close the motor circuit through coil 95a and the motor thus continues to vibrate and advance the ratchet wheel 99a during the time that the tone of oscillator 22 is not being received. Suitable holding pawls 103, 103a cooperate with the ratchets 99, 99a to prevent their reverse rotation. Rotation of ratchet wheel 99a is transmitted by shaft 100a to the input of a differential gearing device 104 having the output or driven shaft 105. Shaft 105 controls the rotation of a driven shaft 106 through a torque converter or amplifier 107 which may be operated by suitable power means such as an electric motor M. A driven sprocket wheel 108 is secured to shaft 106 and in turn is connected to the elevators S by the connections shown including a sprocket chain 108a. The other input shaft 100 of differential 104 is controlled in a similar manner by the relay 83a. The torque converter 107 performs the function of increasing or amplifying the torque supplied by its input shaft 105 and causing its output shaft 106 to rotate in the same direction and through substantially the same angle as its input shaft 105. A suitable torque converter for this purpose is shown and described in the patent application of William A. Black, Ser. No. 284,644, filed July 15, 1939, Patent No. 2,248,942, dated July 15, 1941. This arrangement causes the desired adjustment of the airplane elevators and shaft 106, although the torque applied to shaft 105 by the impulse motors is of small value.

The arrangement described causes shaft 106 and the elevators to remain stationary when the tone frequencies of both the generators 22 and 23 are being transmitted to the receiver 75 and this shaft to rotate in one direction or the other, depending upon which of the tones is omitted, and its rotation will continue for a period of time equal to the duration of the omission. In the example illustrated, motion of lever 2 (Fig. 1) clockwise or forward in the direction of F causes the elimination of the tone frequency of generator 23, to which channel Ea is responsive, and the operation of motor 94 and rotation of elevator control shaft 106 to the right or clockwise. During the movement of lever 2 the tone frequency of generator 22 continues to be received and after the rheostat arm 17 (Fig. 1) has been rotated by the motor 44 a sufficient distance along resistor 12 as to again balance the Wheatstone bridge circuit, the tone frequency of generator 23 is also received. This causes the actuation of relay 83a (Fig. 3) and the interruption of the circuit of motor 94 at contact 92a, so that both motors are at rest and shaft 106, sprocket wheel 108 and the elevators remain locked in their adjusted position.

Movement of lever 2 further forward to its extreme position in the forward direction F again unbalances the bridge circuit (Fig. 1) and causes the elimination of the tone frequency of generator 23 in the manner hereinbefore described. This causes the operation of motor 94 (Fig. 3) and consequent rotation of shaft 106 to its extreme right position. At this time the tone of generator 22 continues to be received, but the movement of sprocket wheel 108 to the extreme right causes the closure of a contact 109 by a cam 110. This causes the passage of a current from a battery 86' to energize the winding of relay 83a, thereby breaking the circuit of motor 94 at contact 92a, which stops the motor. In this manner, exact correspondence in phase position of control lever 2 and elevator sprocket wheel 108 is assured in the extreme clockwise position and the elevators are held in their extreme position.

Upon returning control lever 2 toward its neutral position, the bridge circuit is unbalanced in the opposite direction causing the omission of the tone of generator 22 from the transmission in the manner heretofore described. The tone of generator 23 energizes the channel Ea causing the operation of relay 83a and motor 94a with the consequent rotation of sprocket wheel 108 to the left toward its neutral position. This rotation continues until the control lever 2 reaches its neutral position when the tone frequencies of both generators 22 and 23 are omitted from the transmission in the manner hereinbefore described. This omission causes both the relays 83 and 83a to become de-energized, as shown in Fig. 3, so that the circuits of both the motors 94 and 94a are interrupted and both the motors brought to a stop.

If the sprocket wheel 108 should not be in phase with control lever 2, as, for example, if it is lagging behind lever 2 after the bridge circuit is again balanced by the automatic adjustment of rheostat arm 17 (Fig. 1), both the relays 83 and 83a (Fig. 3) are deenergized. The circuit shown including motor coil 95a, battery 101, contact 92, contact 93a and movable contact 111 which cooperates with a cam 112 is closed, causing operation of the motor 94a and continued rotation of sprocket wheel 108 until it reaches neutral position when the motor circuit is broken at contact 111 and operation of the motor 94a ceases. A similar cam 112a and movable contact 111a serve in a similar manner to secure operation of motor 94 and adjustment of sprocket wheel 108 into its neutral position from the opposite direction. Proper in-phase relationship between the elevator control sprocket wheel 108 and the manual control lever 2 in their neutral positions also is thus assured.

A similar operation takes place in adjusting the sprocket wheel 108 and the elevators from their neutral to their extreme leftward positions. Movement of lever 2 counter-clockwise or rearwardly in the direction of R (Fig. 1) unbalances the bridge circuit and causes the elimination of the tone frequency of generator 22 from the transmission. This causes channel E (Fig. 3) and relay 83 to remain unenergized with the consequent operation of motor 94a in a manner similar to that above described in connection with channel Ea and motor 94. When sprocket wheel 108 reaches its extreme left position and is in phase with control lever 2, which is now in its extreme rearward position, a cam 113 causes closure of contact 114, which in turn causes the passage of current from battery 86 through the winding of relay 83 and the interruption at contact 92 of the circuit including battery 101 and the coil 95a of motor 94a. The motor 94a being interrupted, no further movement of sprocket wheel 108 to the left takes place, but it remains in phase with control lever 2, both being in their extreme counter-clockwise positions, with the elevators in their extreme position.

Figure 4:
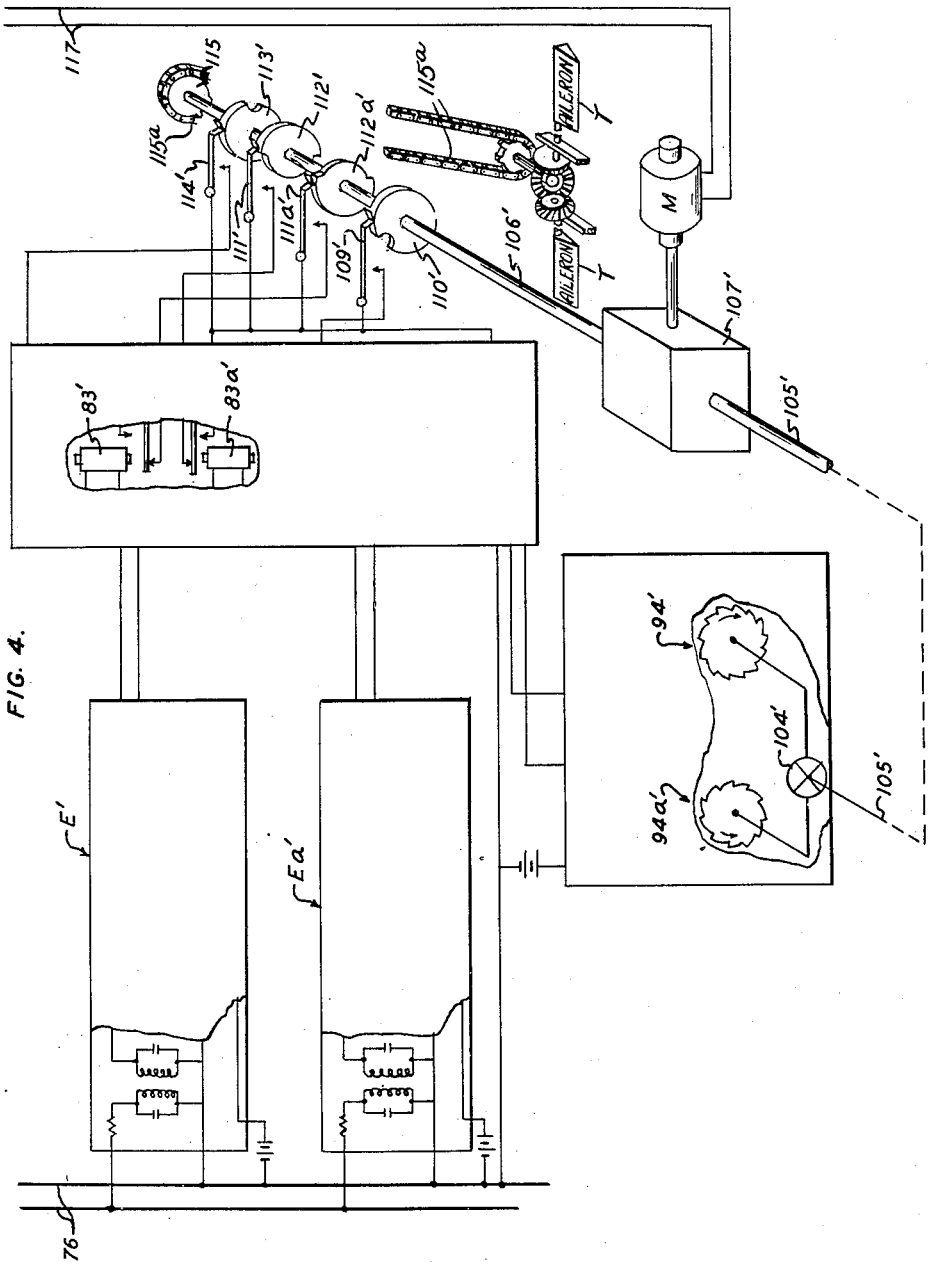
Fig. 4 is an extension of the receiving system of Fig. 3 showing a second unit of the controlled apparatus.

Fig. 4 shows diagrammatically the means for controlling the ailerons of the airplane and comprises the channels E' and Ea', which are constructed similarly to channels E and Ea above described, except that the resonant circuits of channel E' are designed to pass the tone frequency of generator 22' while those of channel Ea' pass the tone frequency of generator 23'. Through the relays 83' and 83a', which are similar to relays 83 and 83a, motors 94' and 94a', which are similar to motors 94 and 94a, a differential 106', torque converter 107' and shaft 106', an aileron sprocket wheel 115 is operated, this wheel being connected to the ailerons T by a sprocket chain 115a and the gearing shown. Shaft 106' has mounted thereon the cams 110', 112', 112a' and 113' which cooperate with the movable switch contacts 109', 111', 111a' and 114', respectively, in the same manner as the cams 110, 112, 112a and 113 cooperate with their respective switch contacts, as above described.

With the lever 2 in its neutral position, as indicated at N in Fig. 1, neither of the tone frequencies of generators 22' nor 23' is transmitted, the relays 83' and 83a' are unenergized, motors 94' and 94a' are not operated and aileron sprocket wheel 115 and the ailerons remain locked in their mid-position. Upon movement of lever 2 to the left in the direction of L, the shaft 1 is rotated causing the rheostat arm 13' to unbalance the bridge circuit comprising the resistors 9' and 12'. This causes the operation of relay 16' in such a direction as to cause the transmission of the tone frequency of generator 23' only. This causes the energization of relay 83a' which in turn causes the operation of motor 94a' and rotation of shafts 105' and 106' to the left. This operation is continued until the rheostat arm 17' (Fig. 2) has been adjusted along the resistor 12' by the motor 43' into such a position as to again balance the bridge circuit. Thereupon the relay 16' is de-energized and the tone frequency of generator 22' restored to the transmission, whereupon the motor 94a' stops and the aileron sprocket wheel 115 remains locked in its adjusted position. Should lever 2 be adjusted into its extreme leftward position, the tone of generator 23' continues to be transmitted in the manner above described in connection with the operation of generator 23 and lever 2. Rotation of shaft 106' to the left, therefore, continues, if sprocket wheel 115 should not be in phase with lever 2, until these two members are again in phase, whereupon cam 113' causes the closure of movable contact 114' and the stoppage of motor 94a' in the manner above described in connection with motor 94a and switch contact 114. The shaft 106' and aileron sprocket wheel 115 then remain locked in their extreme leftward position until the control lever 2 is again moved towards the right.

Upon movement of lever 2 to the right in the direction of r from its extreme left-hand position, the movement of rheostat arm 13' along resistor 9' unbalances the bridge in such a direction as to cause the operation of relay 16 and the transmission of the tone of generator 22' only. This causes the energization of relay 83' which in turn causes the operation of motor 94' and rotation of shaft 106' to the right. This action continues until the bridge circuit is again balanced by the adjustment of rheostat arm 17' along the resistor 12' by the motor 44'. Upon the rebalancing of the bridge circuit, the relay 16' is deenergized and the tone of generator 23' is restored to the transmission with the consequent operation of relay 83a' and the stoppage of motor 94', the sprocket wheel 115 remaining locked in its adjusted position. Upon the adjustment of lever 2 to its neutral position, the tone frequencies of both generators 22' and 23' are omitted from the transmission so that both of the relays 83' and 83a' are unenergized. If at this time the sprocket wheel 115 has not yet reached its neutral position, a circuit is established by the operation of cam 112a' and switch contact 111a', which closes the circuit through the coil of motor 94'. The continued operation of motor 94' rotates the sprocket wheel 115 to its neutral position, when the motor circuit is broken at the contact 111a' and operation of motor 94' ceases, locking the sprocket wheel 115 in its neutral position in phase with control lever 2.

If lever 2 is moved to the right toward r beyond its neutral position, the tone of generator 23' continues to be omitted from the transmission, the tone frequency of generator 22' only being transmitted. This causes the energization of relay 83' and the operation of motor 94', causing the rotation of shaft 106' and sprocket wheel 115 to the right or clockwise until lever 2 is stopped and the bridge circuit rebalanced by the adjustment of rheostat arm 17' along resistor 12' (Fig. 2) by the motor 44'. Upon the bridge circuit being rebalanced, the tone frequency of generator 23' is restored to the transmission so that both the relays 83' and 83a' are energized and the circuit of motor 94' broken in a manner above explained in connection with the relays 83, 83a and motor 94. Upon moving lever 2 further toward its extreme clockwise position, the operation of motor 94' is resumed, and if after the lever 2 reaches its extreme clockwise position and the bridge circuit has again been balanced by the adjustment of rheostat arm 17' along resistor 12', the sprocket wheel 115 (Fig. 4) has not yet reached its extreme position to the right, the transmission of the tone frequency of generator 22' continues, causing continued operation of motor 94'. Upon the sprocket wheel 115 reaching its extreme right-hand position in phase with control lever 2, the cam 110' causes the closure of switch contact 109' and the stoppage of motor 94' in the manner above explained in connection with motor 94, cam 110 and contact 109 (Fig. 3).

It is thus seen that means is disclosed to provide in-phase relationship between the aileron sprocket wheel and the operators control lever in their neutral positions and also in both their extreme operating positions.

The torque amplifier motors M are shown in Figs. 3 and 4 as being supplied with current from a single current source illustrated as a storage battery 116 through a circuit including the leads 117 and a movable switch contact 118.

From the foregoing it will be readily understood that upon the closure of switch 74, Fig. 1, by the operator at the ground station and the consequent elimination of the tone frequencies of all the generators 22, 23, 22' and 23' from the transmission, both the controlled shafts 106 and 106' (Figs. 3 and 4) will be automatically returned to their mid or neutral position by means of the cams 112, 112a, 112' and 112a' in the manner previously described. The switch 74, therefore, provides a very convenient means for permitting the operator to quickly restore the elevators and ailerons of the controlled plane to their normal or neutral position.

I have described what I believe to be the best embodiments of my invention. I do not wish, however, to be confined to the embodiments shown, but what I desire to cover by Letters Patent is set forth in the appended claims.

I claim:

1. Means for adjusting an oscillatable device in either direction from a normally neutral position, comprising in combination, a normally balanced Wheatstone bridge, a compensating impedance, a manual control member adapted for unbalancing said bridge, means controlled by said manual control member for connecting a variable portion of said compensating impedance in series with said bridge in accordance with the extent of adjustment of the manual control member, automatic means for restoring the bridge to a balanced condition, and means responsive to the unbalanced condition of the bridge for causing the movement of the device in a predetermined direction during the interval while the bridge remains unbalanced.

2. Means for controlling an adjustable device comprising, in combination, a Wheatstone bridge comprising a pair of oppositely disposed resistors, a source of steady potential connected across the ends of said resistors, a circuit connected across a pair of points on said resistors which are of substantially the same potential, said circuit comprising a current responsive device and a pair of contacts adjustable along said resistors and means for causing a substantially equal response of the current responsive device for equal movement of one of said adjustable contacts along its resistor throughout its range of movement, said means comprising a device for regulating the value of the current from the steady potential source passing through the Wheatstone bridge.

3. The combination as set forth in claim 2 in which an adjustable resistor is connected across the terminals of the current responsive device to control the sensitivity thereof.

4. Means for controlling an adjustable device comprising, in combination, a Wheatstone bridge comprising a pair of oppositely disposed resistors, a compensating resistor having its midpoint connected to one end of said bridge, a circuit connected to the other end of said bridge and comprising a source of steady potential and a first contact adjustable along said compensating resistor; a circuit adapted to be connected across the centers of said pair of resistors and comprising a current responsive device and a second contact which is adjustable along one of the resistors of said pair; and a single control means arranged to adjust the second contact along its resistor and to cause the adjustment of said first contact along the compensating resistor.

5. The combination as set forth in claim 4 in which the single control means is arranged to adjust the first contact toward the midpoint of the compensating resistor simultaneously with the adjustment of the second contact toward the midpoint of its resistor.

6. The combination as set forth in claim 4 in which the resistance per unit length of said compensating resistor is greater near its ends than at its mid-portion.

7. The combination as set forth in claim 4 in which the circuit connected across the resistors also comprises a third contact adjustable along the second resistor of the pair, and automatic means for adjusting the third contact so as to rebalance the bridge.

8. Means for controlling an adjustable device comprising, in combination, a Wheatstone bridge comprising a pair of oppositely disposed resistors, a source of steady potential connected across the ends of said resistors, a circuit connected across a pair of points on said resistors which are of substantially the same potential, said circuit comprising a current responsive device and a pair of contacts adjustable along said resistors, adjustable means for controlling the sensitivity of said current responsive device and means for maintaining the impedance of said circuit between said pair of contacts substantially constant.

9. The combination as set forth in claim 8 in which the adjustable means comprises a variable resistor connected across the terminals of the current responsive device and the means for maintaining the impedance of the circuit substantially constant comprises a variable resistor connected in series with the current responsive device.

10. Means for controlling an adjustable device comprising, in combination, a Wheatstone bridge having four arms, each arm having impedance; a source of steady potential, a circuit connected across a pair of points on said arms which are of substantially the same potential, said circuit comprising a current responsive device and a contact adjustable along one of the bridge arms, an energizing circuit connecting said potential source to a pair of diagonal points on the bridge arms, said energizing circuit including a series connected impedance and a single control member arranged to adjust said contact along its bridge arm to unbalance the bridge and to simultaneously increase said last-named impedance.

11. A control means as set forth in claim 10 in which the series connected impedance comprises a tapered resistor.

DONALD S. KELLOGG.